United States Patent
Minami et al.

(10) Patent No.: US 8,063,177 B2
(45) Date of Patent: Nov. 22, 2011

(54) PRE-EXPANDED POLYPROPYLENE RESIN PARTICLE, AND METHOD FOR PRODUCTION THEREOF

(75) Inventors: Tetsuya Minami, Settsu (JP); Tetsuya Shibata, Settsu (JP); Hidekazu Oohara, Settsu (JP)

(73) Assignee: Kaneka Corporation, Osaka-shi (JP)

( * ) Notice: Subject to any disclaimer, the term of this patent is extended or adjusted under 35 U.S.C. 154(b) by 0 days.

(21) Appl. No.: 12/680,770

(22) PCT Filed: Sep. 29, 2008

(86) PCT No.: PCT/JP2008/067656
§ 371 (c)(1),
(2), (4) Date: Mar. 30, 2010

(87) PCT Pub. No.: WO2009/047998
PCT Pub. Date: Apr. 16, 2009

(65) Prior Publication Data
US 2010/0240854 A1    Sep. 23, 2010

(30) Foreign Application Priority Data
Oct. 11, 2007    (JP) .................. 2007-265793

(51) Int. Cl.
*C08F 6/00*    (2006.01)
*C08J 3/00*    (2006.01)
(52) U.S. Cl. ......... 528/502; 264/50; 264/51; 264/176.1; 264/219; 521/56; 521/58; 521/59; 521/60
(58) Field of Classification Search .............. 264/50, 264/51, 176.1, 219; 521/56, 58, 59, 60; 528/502
See application file for complete search history.

(56) References Cited

U.S. PATENT DOCUMENTS

| | | | | | |
|---|---|---|---|---|---|
| 6,130,266 | A | * | 10/2000 | Mihayashi et al. | ............ 521/58 |
| 6,214,896 | B1 | * | 4/2001 | Mogami et al. | ................ 521/58 |

FOREIGN PATENT DOCUMENTS

| | | |
|---|---|---|
| JP | 4-253741 A | 9/1992 |
| JP | 5-179050 A | 7/1993 |
| JP | 10-77359 A | 3/1998 |
| JP | 10-119037 A | 5/1998 |
| JP | 2000-95891 A | 4/2000 |
| JP | 2000-143866 A | 5/2000 |
| JP | 2003-147116 A | 5/2003 |

OTHER PUBLICATIONS

International Search Report of PCT/JP2008/067656, mailing date of Nov. 18, 2008.

* cited by examiner

*Primary Examiner* — Terressa Boykin
(74) *Attorney, Agent, or Firm* — Westerman, Hattori, Daniels & Adrian, LLP

(57) ABSTRACT

A pre-expanded polypropylene resin particle can be produced in the following manner: a polypropylene resin particle produced by an under water cut method, water, a dispersing agent, and a foaming agent are charged in a pressure-resistant container, the resulting mixture is heated to a temperature equal to or higher than the softening temperature of the polypropylene resin particle to allow the polypropylene resin particle to be impregnated with the foaming agent under pressure, and the resulting product is released into the atmosphere having a pressure lower than the pressure of the inside of the pressure-resistant container. As the polypropylene resin composition, a composition is used which comprises 100 parts by weight of a polypropylene resin and 1 to 20 parts by weight of a polyethylene resin having a melt viscosity of 10 to 2000 mPa·s at 140° C., whereby it becomes possible to reduce the pressure of a heated molding vapor required for producing an in-mold expanded molding product having a fusion rate of 75% or higher.

6 Claims, 1 Drawing Sheet

DSC curve

PRE-EXPANDED POLYPROPYLENE RESIN PARTICLE, AND METHOD FOR PRODUCTION THEREOF

TECHNICAL FIELD

The present invention relates to pre-expanded polypropylene resin particles for use, for example, in buffering packing materials, shipping boxes, automobile interior parts, core materials for automobile bumpers and heat insulators and others, a production method thereof and an in-mold expansion-molded article therefrom.

BACKGROUND ART

In-mold expansion-molded articles prepared by using pre-expanded polypropylene resin particles are characteristic in their freedom in designing the shape, lightness and heat insulation efficiency, i.e., advantages of in-mold expansion-molded articles. When compared with similar in-mold expansion-molded article, they are superior in chemical resistance, heat resistance and distortion recovery rate after compression, compared with in-mold expansion-molded articles prepared by using pre-expanded polystyrene resin particles and also superior in dimensional accuracy, heat resistance and compression strength, compared with in-mold expansion-molded articles prepared by using pre-expanded polyethylene resin particles. Due to these characteristics, the in-mold expansion-molded articles prepared by using pre-expanded polypropylene resin particles have been used as automobile interior parts, core materials for automobile bumpers, and also in various applications such as heat insulators and buffering packaging materials.

Polypropylene resin particles are prepared, for example, by strand-cutting method or underwater cutting method. It is possible to produce uniform resin particles in cylindrical shape with a relatively inexpensive equipment by the strand-cutting method, but production of fine polypropylene resin particles of 2 mg/particle or less in weight by the method resulted in frequent miscutting and breakage of the strands, leading to deterioration in productivity. In addition, there was a problem of relatively low productivity and others, because there is a limit in increasing the number of strands.

It is known that it is easy to initiate granulation and possible to produce uniform-sized polypropylene resin particles at high productivity with less miscutting by the underwater cutting method, because the strand needs not be withdrawn.

Patent Document 1 describes a problem in the method of producing polypropylene resin particles for pre-expanded polypropylene resin particles by the underwater cutting method that the fusion rate of the pre-expanded polypropylene resin particles during in-mold expansion molding is not favorable, and discloses a method of extruding a resin into high-temperature circulating water and cutting the extruded resin in the water, as a countermeasure. However, it is needed to add slightly water-soluble inorganic materials, surfactants and antifoams to the circulating water for prevention of agglomeration, and it is necessary to add the ingredients above consistently for preservation of the concentrations of the additives in the circulating water, which may lead to water pollution.

Patent Document 2 discloses pre-expanded particles prepared from a resin mixture containing 55 to 95 wt % α-olefin-propylene copolymer having a flexural rigidity of 7000 to 14000 kg/cm$^2$ and 5 to 45 wt % linear polyethylene resin having a density of 0.88 to 0.94 g/cm3 as base resin, for the purpose of providing an in-mold expansion-molded polyolefin resin article superior in buffering property, impact resistance and heat resistance. However, the Patent Document does not describe anything about the problem that the fusion rate of the pre-expanded particles prepared by the underwater cutting method is unfavorable.

Patent Document 3 discloses that expanded resin particles having a core layer of a crystalline thermoplastic resin in the expanded state and a sheath layer of an ethylenic polymer having a melting point lower than the thermoplastic resin in the non-expanded state have favorable fusion rate even at low heating steam pressure. However, the method demands a large-scale production equipment, because two extruders are needed.

Patent Document 1: JP-A No. 10-119037
Patent Document 2: JP-A No. 4-253741
Patent Document 3: JP-A No. 10-77359

DISCLOSURE OF THE INVENTION

Problems to be Solved by the Invention

The inventors have tried to obtain an in-mold expansion-molded article by using pre-expanded polypropylene resin particles obtained by producing polypropylene resin particles from a polypropylene resin by the underwater cutting method, placing the polypropylene resin particles, water, a dispersant and an expanding agent in a pressure container, heating the mixture to a temperature not lower than the softening point of the polypropylene resin particles, impregnating the polypropylene resin particles with the expanding agent under pressure, and then discharging the mixture out of the pressure container into low-pressure atmosphere, and then found a problem that in-mold expansion-molded articles having a similar fusion rate cannot be obtained, if it is not heated during in-mold expansion molding at a molding steam pressure higher by 0.1 MPa, compared to the pressure when in-mold expansion-molded articles are prepared by using pre-expanded polypropylene resin particles obtained from the polypropylene resin particles prepared by the strand-cutting method. The fusion rate is the rate of broken particles in all pre-expanded particles when a plate-shaped in-mold expansion-molded article was cut to two exact same pieces along a crack approximately 5 mm in depth engraved with a cutter knife in the center of the face of the in-mold expansion-molded article where the surface area is largest, and the cut cross section was observed.

An object of the present invention, which is made to solve the newly found problems above, is to provide pre-expanded polypropylene resin particles that can reduce the molding steam pressure needed for obtaining an in-mold expansion-molded article having a fusion rate of 75% or more during in-mold expansion molding of the pre-expanded polypropylene resin particles from polypropylene resin particles prepared by the underwater cutting method, and a method of producing the same.

Means to Solve the Problems

After intensive studies, the inventors have found that it was possible, by producing polypropylene resin particles from a polypropylene resin composition containing 100 wt parts of a polypropylene resin and 1 to 20 wt parts of a polyethylene resin having a melt viscosity of 10 to 2000 mPa·s by the underwater cutting method, to make the polyethylene resin present more on the surface of the pre-expanded polypropylene resin particles obtained from the polypropylene resin particles and, as a result, to reduce the molding steam pressure during in-mold expansion molding thereof.

Thus, the present invention relates to pre-expanded polypropylene resin particles, characterized by being prepared by melt-kneading a polypropylene resin composition in an extruder, extruding the composition through nozzles of a die connected to the tip of the extruder into water, cutting the extruded resin composition in the water with a revolving cutter blade into polypropylene resin particles, placing the polypropylene resin particles, water, a dispersant, and an expanding agent to a pressure container, heating the mixture to a temperature not lower than the softening point of the polypropylene resin particles, impregnating the polypropylene resin particles with the expanding agent under pressure, and discharging the mixture out of the pressure container into low-pressure atmosphere, wherein the polypropylene resin composition contains 1 to 20 wt parts of a polyethylene resin having a melt viscosity of 10 to 2000 mPa·s at 140° C. with respect to 100 wt parts of the polypropylene resin.

In a preferable embodiment, it relates to the pre-expanded polypropylene resin particles above, wherein the particle weight of the pre-expanded polypropylene resin particles is 0.4 to 2.0 mg/particle.

In another preferable embodiment, it relates to the pre-expanded polypropylene resin particles above, wherein the heat of the fusion peak appearing in the highest-temperature range during thermal analysis of the pre-expanded polypropylene resin particles by differential scanning calorimetry is 5 to 50 J/g In addition, the present invention also relates to a method of producing the pre-expanded polypropylene resin particles above, comprising melt-kneading a polypropylene resin composition in an extruder, extruding the composition through nozzles of a die connected to the tip of the extruder into water, cutting the extruded resin composition in the water with a revolving cutter blade into polypropylene resin particles, placing the polypropylene resin particles. water, a dispersant, and an expanding agent to a pressure container, impregnating the polypropylene resin particle with the expanding agent under pressure by heating the mixture to a temperature not lower than the softening point of the polypropylene resin particles, and discharging the mixture out of the pressure container into low-pressure atmosphere, wherein the polypropylene resin composition contains 1 to 20 wt parts of a polyethylene resin having a melt viscosity of 10 to 2000 mPa·s at 140° C. with respect to 100 wt parts of the polypropylene resin.

In a favorable embodiment, it relates to the method of producing the pre-expanded polypropylene resin particles described above, wherein the polyethylene resin has a melt viscosity of 10 to 1500 mPa·s at 140° C.

In addition, the present invention also relates to an in-mold expansion-molded article, characterized by being prepared by in-mold expansion molding of the pre-expanded polypropylene resin particles described above.

Advantageous Effects of the Invention

According to the present invention, it is possible to obtain pre-expanded polypropylene resin particles having a fusion rate of 75% or more that can reduce the molding steam pressure needed for molding of the in-mold expansion-molded article, by preparing polypropylene resin particles from a polypropylene resin composition containing 100 wt parts of a polypropylene resin and 1 to 20 wt parts of a polyethylene resin having a melt viscosity of 10 to 2000 mPa·s by the underwater cutting method.

BEST MODE OF CARRYING OUT THE INVENTION

Figure 1:
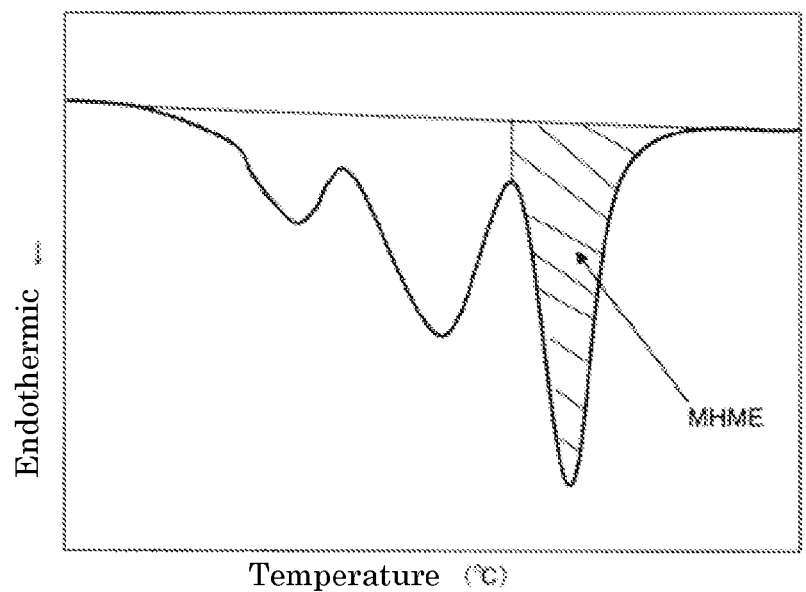
FIG. 1 is a graph showing an example of the heat of the fusion peak appearing in the highest-temperature range (hereinafter, referred to as "MHME") in the DSC curve obtained when the pre-expanded polypropylene resin particles according to the present invention are analyzed by using a differential scanning calorimeter (hereinafter, referred to as "DSC"). The abscissa shows temperature, while the ordinate shows the heat absorbed, and the shaded region in the Figure corresponds to MHME.

The polypropylene resin used in the present invention is a polymer containing propylene monomer units in an amount of 50 wt % or more, preferably 80 wt % or more, and more preferably 90 wt % or more that is preferably polymerized by using a Ziegler-type catalyst such as titanium chloride-based catalyst, metallocene catalyst, or post metallocene catalyst and is higher in stereoregularity. Typical examples thereof include propylene homopolymers, ethylene-propylene random copolymers, propylene-butene random copolymers, ethylene-propylene-butene random copolymers, ethylene-propylene block copolymers, maleic anhydride-propylene random copolymers, maleic anhydride-propylene block copolymers, propylene-maleic anhydride graft copolymers and the like, and these polymers may be used alone or as mixed. In particular, ethylene-propylene random copolymers, propylene-butene random copolymers and ethylene-propylene-butene random copolymers can be used favorably. In addition, these polypropylene resins are preferably uncrosslinked, but crosslinked resins may also be used.

The polypropylene resin used in the present invention preferably has a melt index (hereinafter, referred to as "MI"), as determined according to JIS K7210 at a temperature of 230° C. and a load of 2.16 kg, of 0.1 to 15 g/10 minute, more preferably 2 to 12 g/10 minute. At a MI of less than 0.1 g/10 minute, the expanding force of the pre-expanded particles, when produced, is small, possibly making it difficult to produce pre-expanded particles at high expansion rate. Alternatively at a MI of more than 15 g/10 minute, the cells may be broken during production of the pre-expanded particles.

For obtaining an in-mold expansion-molded article superior in mechanical strength and heat resistance, the polypropylene resin used in the present invention preferably has a melting point of 130 to 168° C., more preferably 135 to 160° C., and particularly preferably 140 to 155° C. When the melting point is in the range above, it is much easier to make moldability, mechanical strength and heat resistance well-balanced.

In the present invention, the melting point (hereinafter, referred to as "Tm") of the polypropylene resin is a peak temperature of the endothermic curve in the DSC curve obtained by heating 1 to 10 mg of polypropylene resin from 40° C. to 220° C. at a heating rate of 10° C./minute, cooling it to 40° C. at a rate of 10° C./minute, and re-heating it to 220° C. at a rate of 10° C./minute in a differential scanning calorimeter.

The polyethylene resin for use in the present invention has a melt viscosity of 10 to 2000 mPa·s at 140° C. It is preferably 10 to 1500 mPa·s, more preferably 10 to 300 mPa·s. When the melt viscosity is in the range above, it is possible to decrease the molding steam pressure needed for molding of in-mold expansion-molding article having a fusion rate of 75% or more. In the present invention, the melt viscosity of the polyethylene resin is a value determined by heating and melting the polyethylene resin at 140° C. and measuring the melt viscosity with a Brookfield viscometer.

Typical examples of the polyethylene resins include polyethylenes such as high-density polyethylenes (HDPE), medium-density polyethylenes (MDPE), low-density polyethylenes (LDPE) and linear low-density polyethylenes (L-LDPE); ethylene-butene copolymers, ethylene-vinyl acetate copolymers and the like, and these resins may be used alone or as a mixture of two or more.

In the present invention, the content of the polyethylene resin is 1 to 20 wt parts, preferably 3 to 10 wt parts, with respect to 100 wt parts of the polypropylene resin. When the content of the polyethylene resin is less than 1 wt parts, it is not possible to reduce the molding steam pressure at 75% or more of the fusion rate. On the other hand, when the content is more than 20 wt parts, the in-mold expansion-molded article obtained may show decline in mechanical properties such as compression strength and also in heat resistance.

In the present invention, various additives may be added as needed, in the range that does not impair the properties of the polypropylene resin composition, during production of the polypropylene resin particles. Examples of the additives include antioxidants, ultraviolet absorbents, lubricants, antistatic agents, flame retardants, fillers, crystal nucleating agent, bubble regulators, colorants and the like.

In the present invention, melt extrusion of the polypropylene resin composition is carried out by using a single screw extruder, preferably a twin screw extruder or the like. The resin temperature, as determined by a resin thermometer installed in the die inlet port of the extruder, is preferably 200 to 280° C., more preferably 210 to 260° C. Nozzle clogging is often observed leading not to produce stably at a temperature lower than 200° C., and thermal degradation of the resin may proceed, leading to deterioration in physical properties at a temperature of higher than 280° C.

In the present invention, the nozzle diameter is preferably 0.2 to 1.0 mm, more preferably 0.4 to 0.7 mm. When the nozzle diameter is less than 0.2 mm, nozzle clogging is observed more frequently, leading to decrease in productivity. When the nozzle diameter is more than 1.0 mm, the shape of the pre-expanded polypropylene resin particles having a particle weight 2.0 mg/particle or less becomes flat, possibly leading to deterioration in filling efficiency during in-mold expansion molding. The ratio L/D of length L to diameter D of the polypropylene resin particles is preferably 0.5 or more and 2 or less, for making the shape of the pre-expanded polypropylene resin particles approximately spherical. In the present invention, the temperature of circulating water is preferably 20 to 95° C., more preferably 30 to 95° C., and still more preferably 40 to 95° C. When it is lower than 20° C., nozzle clogging may be observed more frequently, leading to decrease in productivity. When it is higher than 95° C., the polypropylene resin particles may be agglomerated more easily.

The pressure of the water, in which the resin extruded out of nozzle is cut with a cutter blade, is preferably 0.1 MPa or more and 2.0 MPa or less (gauge pressure). When the water pressure is less than 0.1 MPa, the area close to the revolving cutter blade becomes in vacuum state during cutting of the resin extruded out of the nozzle, which easily generates steam bubbles, agglomeration of polypropylene resin particles, and fluctuation in particle shape.

The pre-expanded polypropylene resin particles according to the present invention is prepared by placing a dispersion containing polypropylene resin particles of the polypropylene resin composition that is obtained as described above, and contains the polypropylene resin and a polyethylene resin having a melt viscosity of 10 to 2000 mPa·s, water, a dispersant, and an expanding agent in a pressure container, heating the polypropylene resin particles to a temperature not lower than the softening point, impregnating the polypropylene resin particles with the expanding agent under pressure, and expanding the polypropylene resin particles by discharging the dispersion containing the polypropylene resin particles and water into an atmosphere at a pressure lower than that in the pressure container. Specifically, the particles are prepared, for example, by placing an aqueous dispersion containing polypropylene resin particles, an expanding agent, a dispersant and a dispersion aid in a pressure container, heating the dispersion under agitation to a temperature not lower than the softening point of the polypropylene resin particles (hereinafter, referred to as "expansion temperature"), impregnating the polypropylene resin particle with the expanding agent under pressure, adding the expanding agent additionally as needed, controlling the pressure container at a constant pressure (hereinafter, referred to as "expansion pressure"), and discharging the dispersion from the bottom of the pressure container into an atmosphere at a pressure lower than the internal pressure of the pressure container. The pressure container for use is not particularly limited, if it can withstand the pressure and the temperature in the container during production of the pre-expanded particles, and examples thereof include autoclave-type pressure containers.

The expanding agent may be a known compound, and examples thereof include aliphatic hydrocarbons such as propane, isobutane, n-butane, isopentane and n-pentane and the mixtures thereof; inorganic gases such as air, nitrogen and carbon dioxide; water and the like. The amount of the expanding agent used varies according to the kind of the polypropylene resin used, the composition of the base resin, the kind of the expanding agent, desired expansion rate and others and thus cannot be specified particularly, but it is preferably approximately 2 to 60 wt parts with respect to 100 wt parts of the polypropylene resin particles. If water is used as the expanding agent, the water used as the dispersion medium may be used.

Examples of the dispersants favorably used include slightly water-soluble inorganic compounds such as basic tribasic calcium phosphate, basic magnesium carbonate, calcium carbonate, aluminum oxide and kaolin. Examples of the dispersion aids favorably used include anionic surfactants such as sodium dodecylbenzenesulfonate, sodium n-paraffinsulfonate, sodium α-olefinsulfonate, and sodium oleate. With respect to 100 wt parts of water, the amount of the dispersant used is preferably 0.1 to 3 wt parts and the amount of the dispersion aid used is preferably 0.0001 to 0.1 wt part.

The water dispersing the polypropylene resin may be made acidic by addition of an acid thereto, for reduction the amount of the dispersant adhered to the pre-expanded polypropylene resin particles.

The dispersion containing polypropylene resin particles thus prepared in the pressure container is heated to a particular expansion temperature under agitation and held at the same temperature for a certain period, normally 5 to 180 minutes, preferably 10 to 60 minutes, and the pressure in the pressure container is raised, allowing impregnation of polypropylene resin particles by the expanding agent. Then, the expanding agent is supplied additionally to the dispersion to a predetermined expansion pressure, and the dispersion is held in the state for a certain period, normally 5 to 180 minutes, preferably 10 to 60 minutes. In this way, the dispersion of polypropylene resin particles held under the expansion temperature and the expansion pressure is discharged out of a valve attached at the bottom of the pressure container into low-pressure atmosphere, normally at atmospheric pressure, to give pre-expanded polypropylene resin particles.

During discharge of the dispersion into low-pressure atmosphere, the dispersion may be discharged out of an orifice having a diameter of 2 to 10 mm, for adjustment of the flow rate and reduction in fluctuation of expansion rate. In addition, the low-pressure atmosphere may be filled with saturated steam for increase of the expansion rate.

The expansion temperature varies according to the melting point [Tm (° C.)] of the polypropylene resin used, the kind of the expanding agent and others, and cannot be specified particularly, but it is normally adjusted approximately in the range of (Tm−30) to (Tm+10)° C. Alternatively, the expansion pressure varies according to the kind of the polypropylene resin used, the kind of the expanding agent, the desired expansion rate of the pre-expanded particles and others, and cannot be specified particularly, but it is normally adjusted approximately in the range of 1 to 8 MPa (gauge pressure).

The heat of the fusion peak appearing in the highest-temperature range (hereinafter, referred to as "MHME") of the pre-expanded polypropylene resin particles according to the present invention thus obtained is preferably 5 to 50 J/g, more preferably 10 to 30 J/g. For example as shown in FIG. 1, in the case that there are observed two or three fusion peaks in the DSC curve obtained by measurement by differential scanning calorimetry (hereinafter, referred to as "DSC") when the sample is heated from 40° C. to 220° C. at a heating rate of 10° C./minute, the MHME is a heat of fusion corresponding to the area defined by drawing a straight line between the base lines of the pre-expanded particle before and after fusion, drawing a vertical line from the maximum point in the DSC curve between the peak at the highest temperature and the peak next to it, and determining the high-temperature-sided area enclosed by these two straight lines and the DSC curve.

The particle weight of the pre-expanded polypropylene resin particles is preferably 0.4 to 2.0 mg/particle, more preferably 0.6 to 1.8 mg/particle. The particle weight of the pre-expanded polypropylene resin particles can be adjusted by control of the condition for extrusion of the polypropylene resin composition in the molten state.

The bulk density of the pre-expanded polypropylene resin particles according to the present invention is preferably 10 to 200 g/L, more preferably 15 to 150 g/L. The bulk density is a value obtained by allowing the pre-expanded particles to fall freely into a cylindrical container having an inner diameter of 240 mm and an inner height of 257 mm from a position 30 cm higher than the top of the container, measuring the total weight of the container, when it is filled with the pre-expanded particles completely, and dividing the difference between the total weight and the weight of the container by the container volume of 11.63 L.

The pre-expanded polypropylene resin particles thus obtained can be molded into an in-mold expansion-molded polypropylene resin article by a known molding method. The particles are molded, for example, by A) a method of filling the pre-expanded particles into a mold, compressing the pre-expanded particles to an in-mold volume smaller by 15 to 50% and heat-fusing the particles with steam; B) a method of filling the pre-expanded particles into a mold under gas pressure and heat-fusing the particles with steam by using the recovery force of the pre-expanded particles; C) a method of applying a particular internal pressure to the pre-expanded particles by pressurizing the pre-expanded particles with the inorganic gas and then impregnating the pre-expanded particles with inorganic gas, filling the particles into a mold, and heat-fusing the particles with steam; or D) a method of filling the pre-expanded particles into a mold without any particular pretreatment and heat-fusing the particles with steam. The inorganic gas for use may be air, nitrogen, oxygen, helium, neon, argon, carbon dioxide gas or the like. These gases may be used alone or in combination of two or more. In particular, use of air or nitrogen, which is higher in flexibility of use, is preferable.

When the polypropylene resin particles according to the present invention are used, the polyethylene resin may be present more densely in the region close the resin surface in contact with the channel internal wall, by the high shearing force characteristic of the underwater cut system having a smaller nozzle diameter. Thus, during in-mold expansion molding of the pre-expanded polypropylene resin particles according to the present invention, it is possible to obtain in-mold expansion-molded articles favorable in fusion rate at a low molding steam pressure.

The fusion-starting temperatures of the surface of the pre-expanded polypropylene resin particles according to the present invention and of the pre-expanded polypropylene resin particles containing no polyethylene resin were determined. Although the fusion-starting temperature varies according to the kind and amount of the polyethylene resin used, MHME and others, the fusion-starting temperature of the surface of the pre-expanded particles according to the present invention was lower by 5 to 20° C. than the melting point of the base resin, while the fusion-starting temperature of the surface of the pre-expanded polypropylene resin particles containing no polyethylene resin was in the range of the melting point of base resin±5° C. The surface fusion-starting temperature of the pre-expanded polypropylene resin particles is correlated well with the temperature needed for fusion of the pre-expanded polypropylene resin particles with each other by steam heating during in-mold expansion molding, and the molding steam pressure needed for preparing an in-mold expansion-molded article having a fusion rate of 75% or more can be reduced, when the surface fusion-starting temperature is lower.

Figure 2:
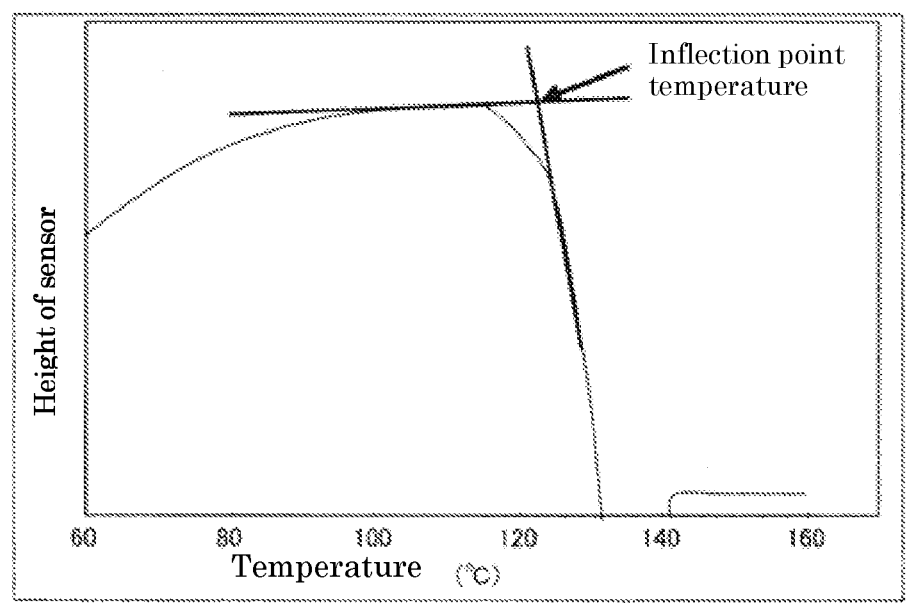
FIG. 2 is a graph showing an example of the temperature-displacement spectrum used for determination of the surface fusion-starting temperature of the pre-expanded polypropylene resin particles. The abscissa shows temperature, while the ordinate shows probe position (sensor height), and the inflection point temperature is determined from the intersection of the two tangent lines before and after the inflection point. The inflection point temperatures thus determined are averaged and used as the surface fusion-starting temperature.

The fusion-starting temperature is determined by bringing a thermal probe into contact with a pre-expanded polypropylene resin particle, heating the particles while the tip is located at a position of less than 10 nm deep from the particle surface, and detecting the displacement of the probe (sensor) in the height direction that occurs simultaneously with resin fusion. The surface fusion temperature is determined from the detected displacement curve. For example, the surface of a pre-expanded polypropylene resin particle is heated from 40° C. to 200° C. at a heating rate of 5° C./sec by using nano-TA2 (thermal probe tip diameter: ϕ30 nm) manufactured by Japan Thermal Consulting Co., Ltd. The inflection point of the sensor height by fusion in the temperature-displacement spectrum is then determined from the intersection of two tangent lines (see FIG. 2). The inflection point temperature is determined at five positions separated by 30 μm or more, and the calculated inflection point temperatures are averaged, and the average is used as the surface fusion-starting temperature of the present invention.

In contrast to general thermal analyzers, such as DSC, in which the heat for average fusion behavior is analyzed by heating the entire sample, the thermal probe, which measures the surface fusion temperature, can measure fusion behavior in an extremely local region, i.e., on the surface. Thus, the surface fusion-starting temperature of the pre-expanded polypropylene resin particles according to the present invention is often different from the fusion temperature peak, as determined by DSC.

EXAMPLES

Hereinafter, the present invention will be described with reference to Examples and Comparative Examples, but it should be understood that the present invention is not limited to these Examples.

Tests in Examples and Comparative Examples were performed by the following methods:

[Fusion Rate of In-Mold Expansion-Molded Articles]

A plate-shaped in-mold expansion-molded article was cut to two exactly same pieces along a crack of approximately 5 mm in depth engraved with a cutter knife in the center of the face of the in-mold expansion-molded article where the surface area is largest, and the rate of broken particles in all pre-expanded particles was determined, while the cut cross section was observed. In the present Example, an in-mold expansion-molded article with the size of 400 mm length× 300 mm width×40 mm thickness was prepared for evaluation of the fusion rate.

[Lowest Molding Steam Pressure]

An in-mold expansion-molded article is prepared by filling pre-expanded polypropylene resin particles into a block mold of 400 mm length×300 mm width×55 mm thickness in size, by using KD-345 manufactured by DAISEN Co., Ltd., compressing the pre-expanded polypropylene resin particles to an in-mold volume decreased by 27%, introducing steam first at 0.1 MPa (gauge pressure) into the mold having an internal space of 400 mm length×300 mm width×40 mm thickness for replacement of the air therein, and then, thermofusing the particles with heated steam at a pressure in the range of 0.20 to 0.40 MPa (gauge pressure) for 10 seconds. The lowest pressure giving a fusion rate of 75% or more with the in-mold expansion-molded article in the size of 400 mm length×300 mm width×40 mm thickness was used as the lowest molding steam pressure.

[Apparent Density of Moldings]

The length, width and thickness of a plate-shaped in-mold expansion-molded article obtained by in-mold expansion molding were determined with a vernier caliper for calculation of the volume of the in-mold expansion-molded article, and a value obtained by dividing the weight of the in-mold expansion-molded article by the volume of the in-mold expansion molded article was used as the apparent density of the molding.

[Measurement of Melt Viscosity of Polyethylene Resin]

The melt viscosity of polyethylene resin heated and fused at 140° C. was determined by using a Brookfield viscometer.

[Bulk Density of Pre-Expanded Particles]

A value obtained by allowing the pre-expanded particles to fall freely into a cylindrical container having an inner diameter of 240 mm and an inner height of 257 mm from a position 30 cm higher than the top of the container, measuring the total weight of the container when it is filled with the pre-expanded particles completely, and dividing the difference between the total weight and the weight of the container by the container volume of 11.63 L was used as the bulk density.

[Measurement of MHME]

The MHME is a heat obtained by obtaining a DSC curve by differential scanning calorimetry while 2-5 mg of pre-expanded particles are heated from 40° C. to 220° C. at a heating rate of 10° C./minute, and drawing a straight line between the base lines of the pre-expanded particle before and after fusion, drawing a vertical line from the maximum point in the DSC curve between the peak at the highest temperature and the peak next to it, and determining the high-temperature-sided region enclosed by these two straight lines and the DSC curve (see FIG. 1).

Example 1

A melted mixture of 100 wt parts of a polypropylene resin (ethylene-propylene random copolymer, Tm: 146° C., MI: 6 g/10 minute, comonomer content: 3 wt %), 5 wt parts of a polyethylene resin having a melt viscosity of 265 mPa·s, and 0.01 wt part of a nucleating agent talc was extruded out of a die having a nozzle diameter of 0.6 mm and a land length of 3 mm connected to the tip of the extruder into water at a water temperature of 80° C. and a water pressure of 0.1 MPa (gauge pressure) by using a twin screw extruder, and the extruded resin mixture was into fragments with a revolving cutter blade, to give polypropylene resin particles having a particle weight of 1.2 mg/particle. The resin temperature, as indicated by the resin temperature gauge connected to the die inlet unit of the extruder, was 232° C. Subsequently, 100 wt parts of the polypropylene resin particle obtained, 150 wt parts of water, 1.21 wt parts of basic tribasic calcium phosphate and 0.03 wt part of sodium dodecylbenzenesulfonate were placed in a pressure autoclave; 11 wt parts of isobutane as an expanding agent was added thereto under agitation; and the mixture in the autoclave was heated to the expansion temperature of 143° C. Then, isobutane was introduced additionally to the expansion pressure of 1.6 MPa (gauge pressure); the mixture was held at the expansion temperature and the expansion pressure for 30 minutes; and the mixture in the autoclave was discharged out of an orifice having a diameter of 4.0 mm into atmosphere under atmospheric pressure after the valve at the lower autoclave was opened. The pre-expanded polypropylene resin particles thus obtained had a bulk density of 32 g/L, a MHME of 16.9 J/g and cell diameter of 260 μm.

The pre-expanded particles obtained were filled in a block mold in the size of 400 mm length×300 mm width×55 mm thickness and compressed to an expanded particle volume reduced by 27%. The air in the mold was replaced first with 0.1 MPa (gauge pressure) steam, and then the particles were heat-fused by using heated steam at a pressure in the range of 0.20 to 0.40 MPa for 10 seconds to give an in-mold expansion-molded article, and the lowest molding steam pressure and apparent density of the molded article were determined.

Example 2

Polypropylene resin particles were prepared in a manner similar to Example 1, except that the addition amount of the polyethylene resin was changed to 10 wt parts and except the condition shown in Table 1, and pre-expanded polypropylene resin particles were prepared from the polypropylene resin particles. The pre-expanded polypropylene resin particles obtained had a bulk density of 31 g/L, a MHME of 16.6 J/g, and a cell diameter of 290 μm. An in-mold expansion-molded article was prepared from the pre-expanded polypropylene resin particles in a manner similar to Example 1 and the lowest molding steam pressure and the apparent density of the molding were determined.

Example 3

Polypropylene resin particles were prepared in a manner similar to Example 1, except that the addition amount of the polyethylene resin was changed to 20 wt parts and except the condition shown in Table 1, and pre-expanded polypropylene resin particles were prepared from the polypropylene resin particles. The pre-expanded polypropylene resin particles obtained had a bulk density of 30 g/L, a MHME of 16.2 J/g, and a cell diameter of 330 μm. An in-mold expansion-molded article was prepared from the pre-expanded polypropylene resin particles in a manner similar to Example 1 and the lowest molding steam pressure and the apparent density of the molding were determined.

Example 4

Polypropylene resin particles were prepared in a manner similar to Example 1, except that the amount of the polyethylene resin having a melt viscosity of 60 mPa·s was changed to 3 wt parts and except the condition shown in Table 1, and pre-expanded polypropylene resin particles were prepared from the polypropylene resin particles. The pre-expanded polypropylene resin particles obtained had a bulk density of 32 g/L, a MHME of 17.0 J/g, and a cell diameter of 240 μm. An in-mold expansion-molded article was prepared from the pre-expanded polypropylene resin particles in a manner similar to Example 1 and the lowest molding steam pressure and the apparent density of the molding were determined.

Example 5

Polypropylene resin particles were prepared in a manner similar to Example 1, except that the amount of the polyethylene resin having a melt viscosity of 60 mPa·s was changed to 5 wt parts and except the condition shown in Table 1, and pre-expanded polypropylene resin particles were prepared from the polypropylene resin particles. The pre-expanded polypropylene resin particles obtained had a bulk density of 32 g/L, a MHME of 16.9 J/g, and a cell diameter of 260 μm. An in-mold expansion-molded article was prepared from the pre-expanded polypropylene resin particles in a manner similar to Example 1 and the lowest molding steam pressure and the apparent density of the molding were determined.

Example 6

Polypropylene resin particles were prepared in a manner similar to Example 1, except that the amount of the polyethylene resin having a melt viscosity of 60 mPa·s was changed to 10 wt parts and except the condition shown in Table 1, and pre-expanded polypropylene resin particles were prepared from the polypropylene resin particles. The pre-expanded polypropylene resin particles obtained had a bulk density of 31 g/L, a MHME of 16.5 J/g, and a cell diameter of 300 μm. An in-mold expansion-molded article was prepared from the pre-expanded polypropylene resin particles in a manner similar to Example 1 and the lowest molding steam pressure and the apparent density of the molding were determined.

Example 7

Polypropylene resin particles were prepared in a manner similar to Example 1, except that the amount of the polyethylene resin having a melt viscosity of 18 mPa·s was changed to 5 wt parts and except the condition shown in Table 1, and pre-expanded polypropylene resin particles were prepared from the polypropylene resin particles. The pre-expanded polypropylene resin particles obtained had a bulk density of 31 g/L, a MHME of 16.8 J/g, and a cell diameter of 270 μm. An in-mold expansion-molded article was prepared from the pre-expanded polypropylene resin particles in a manner similar to Example 1 and the lowest molding steam pressure and the apparent density of the molding were determined.

Example 8

Polypropylene resin particles were prepared in a manner similar to Example 1, except that the amount of the polyethylene resin having a melt viscosity of 18 mPa·s was changed to 10 wt parts and except the condition shown in Table 1, and pre-expanded polypropylene resin particles were prepared from the polypropylene resin particles. The pre-expanded polypropylene resin particles obtained had a bulk density of 31 g/L, a MHME of 16.5 J/g, and a cell diameter of 300 μm. An in-mold expansion-molded article was prepared from the pre-expanded polypropylene resin particles in a manner similar to Example 1 and the lowest molding steam pressure and the apparent density of the molding were determined.

Example 9

Polypropylene resin particles were prepared in a manner similar to Example 1, except that the amount of the polyethylene resin having a melt viscosity of 1300 mPa·s was changed to 5 wt parts and except the condition shown in Table 1, and pre-expanded polypropylene resin particles were prepared from the polypropylene resin particles. The pre-expanded polypropylene resin particles obtained had a bulk density of 32 g/L, a MHME of 16.9 J/g, and a cell diameter of 250 μm. An in-mold expansion-molded article was prepared from the pre-expanded polypropylene resin particles in a manner similar to Example 1 and the lowest molding steam pressure and the apparent density of the molding were determined.

Example 10

Polypropylene resin particles were prepared in a manner similar to Example 1, except that the amount of the polyethylene resin having a melt viscosity of 1300 mPa·s was changed to 10 wt parts and except the condition shown in Table 1, and pre-expanded polypropylene resin particles were prepared from the polypropylene resin particles. The pre-expanded polypropylene resin particles obtained had a bulk density of 31 g/L, a MHME of 16.6 J/g, and a cell diameter of 290 μm. An in-mold expansion-molded article was prepared from the pre-expanded polypropylene resin particles in a manner similar to Example 1 and the lowest molding steam pressure and the apparent density of the molding were determined.

Example 11

Polypropylene resin particles were prepared in a manner similar to Example 1, except that a melted mixture of 100 wt parts of an ethylene-propylene random copolymer (Tm: 146°

C., MI: 6 g/10 minute, comonomer content: 3 wt %), 5 wt parts of the polyethylene resin having a melt viscosity of 60 mPa·s, 0.01 wt part of a nucleating agent talc and 7.5 wt parts of a master batch containing carbon black at 40 wt % (polypropylene resin composition) was used and except the condition shown in Table 1, and pre-expanded polypropylene resin particles were prepared from the polypropylene resin particles. The pre-expanded polypropylene resin particles obtained had a bulk density of 30 g/L, a MHME of 16.5 J/g, and a cell diameter of 200 µm. An in-mold expansion-molded article was prepared from the pre-expanded polypropylene resin particles in a manner similar to Example 1 and the lowest molding steam pressure and the apparent density of the molding were determined.

Example 12

Polypropylene resin particles were prepared in a manner similar to Example 1, except that a melted mixture of 100 wt parts of an ethylene-propylene random copolymer (Tm: 146° C., MI: 6 g/10 minute, comonomer content: 3 wt %), 5 wt parts of the polyethylene resin having a melt viscosity of 265 mPa·s, 0.01 wt part of a nucleating agent talc and 7.5 wt parts of a master batch containing carbon black at 40 wt % (polypropylene resin composition) was used and except the condition shown in Table 1, and pre-expanded polypropylene resin particles were prepared from the polypropylene resin particles. The pre-expanded polypropylene resin particles obtained had a bulk density of 30 g/L, a MHME of 16.5 J/g, and a cell diameter of 220 µm. An in-mold expansion-molded article was prepared from the pre-expanded polypropylene resin particles in a manner similar to Example 1 and the lowest molding steam pressure and the apparent density of the molding were determined.

Evaluation results of the pre-expanded polypropylene resin particles and in-mold expansion-molded articles obtained in the Examples above are summarized in Table 1.

Comparative Example 1

Polypropylene resin particles were prepared in a manner similar to Example 1, except that no polyethylene resin was used and except the condition shown in Table 2, and pre-expanded polypropylene resin particles were prepared from the polypropylene resin particles. The pre-expanded polypropylene resin particles obtained had a bulk density of 32 g/L, a MHME of 16.8 J/g, and a cell diameter of 210 µm. An in-mold expansion-molded article was prepared from the pre-expanded polypropylene resin particles in a manner similar to Example 1 and the lowest molding steam pressure and the apparent density of the molding were determined.

Comparative Example 2

Polypropylene resin particles were prepared in a manner similar to Example 1, except that the amount of the polyethylene resin having a melt viscosity of 265 mPa·s was changed to 0.5 wt part and except the condition shown in Table 2, and pre-expanded polypropylene resin particles were prepared from the polypropylene resin particles. The pre-expanded polypropylene resin particles obtained had a bulk density of 31 g/L, a MHME of 16.7 J/g, and a cell diameter of 220 µm. An in-mold expansion-molded article was prepared from the pre-expanded polypropylene resin particles in a manner similar to Example 1 and the lowest molding steam pressure and the apparent density of the molding were determined.

Comparative Example 3

Polypropylene resin particles were prepared in a manner similar to Example 1, except that the amount of the polyethylene resin having a melt viscosity of 60 mPa·s was changed to 0.5 wt part and except the condition shown in Table 2, and pre-expanded polypropylene resin particles were prepared from the polypropylene resin particles. The pre-expanded polypropylene resin particles obtained had a bulk density of 31 g/L, a MHME of 16.7 J/g, and a cell diameter of 220 µm. An in-mold expansion-molded article was prepared from the pre-expanded polypropylene resin particles in a manner similar to Example 1 and the lowest molding steam pressure and the apparent density of the molding were determined.

Comparative Example 4

Polypropylene resin particles were prepared in a manner similar to Example 1, except that the amount of the polyethylene resin having a melt viscosity of 11000 mPa·s was changed to 10 wt parts and except the condition shown in Table 2, and pre-expanded polypropylene resin particles were prepared from the polypropylene resin particles. The pre-expanded polypropylene resin particles obtained had a bulk density of 32 g/L, a MHME of 16.6 J/g, and a cell diameter of 260 µm. An in-mold expansion-molded article was prepared from the pre-expanded polypropylene resin particles in a manner similar to Example 1 and the lowest molding steam pressure and the apparent density of the molding were determined.

Evaluation results of the pre-expanded polypropylene resin particles and the in-mold expansion-molded articles obtained in the Comparative Examples above are summarized in Table 2.

TABLE 1

| | | | Example 1 | Example 2 | Example 3 | Example 4 | Example 5 | Example 6 |
|---|---|---|---|---|---|---|---|---|
| Polypropylene resin | Kind | | Ethylene-propylene random copolymer | Ethylene-propylene random copolymer | Ethylene-propylene random copolymer | Ethylene-propylene random copolymer | Ethylene-propylene random copolymer | Ethylene-propylene random copolymer |
| | wt part | | 100 | 100 | 100 | 100 | 100 | 100 |
| Polyethylene resin | Melt viscosity | mPa · S | 265 | 265 | 265 | 60 | 60 | 60 |
| | Density | g/cm3 | 0.91 | 0.91 | 0.91 | 0.97 | 0.97 | 0.97 |
| | wt part | | 5 | 10 | 20 | 3 | 5 | 10 |
| Master batch | Carbon black | wt % | — | — | — | — | — | — |
| | wt part | | — | — | — | — | — | — |
| Expansion | Expanding agent | | Butane | Butane | Butane | Butane | Butane | Butane |
| | Addition amount of | wt part | 11 | 11 | 11 | 11 | 11 | 11 |

TABLE 1-continued

|  |  |  | | | | | | |
|---|---|---|---|---|---|---|---|---|
|  | expanding agent |  |  |  |  |  |  |  |
|  | Expansion temperature | °C. | 143 | 143 | 142 | 143 | 143 | 142 |
|  | Particle weight | mg | 1.2 | 1.2 | 1.2 | 1.2 | 1.2 | 1.2 |
|  | Bulk density | g/L | 32 | 31 | 30 | 32 | 32 | 31 |
|  | MHME | J/g | 16.9 | 16.6 | 16.2 | 17.0 | 16.9 | 16.5 |
| Molding | Apparent density of molding | g/L | 46 | 47 | 45 | 46 | 46 | 47 |
|  | Lowest molding steam temperature | Mpa (gauge pressure) | 0.28 | 0.24 | 0.22 | 0.29 | 0.26 | 0.23 |

|  |  |  | Example 7 | Example 8 | Example 9 | Example 10 | Example 11 | Example 12 |
|---|---|---|---|---|---|---|---|---|
| Polypropylene resin | Kind |  | Ethylene-propylene random copolymer | Ethylene-propylene random copolymer | Ethylene-propylene random copolymer | Ethylene-propylene random copolymer | Ethylene-propylene random copolymer | Ethylene-propylene random copolymer |
|  | wt part |  | 100 | 100 | 100 | 100 | 100 | 100 |
| Polyethylene resin | Melt viscosity | mPa·S | 18 | 18 | 1300 | 1300 | 60 | 265 |
|  | Density | g/cm3 | 0.96 | 0.96 | 0.90 | 0.90 | 0.97 | 0.91 |
|  | wt part |  | 5 | 10 | 5 | 10 | 5 | 5 |
| Master batch | Carbon black | wt % | — | — | — | — | 40 | 40 |
|  | wt part |  | — | — | — | — | 7.5 | 7.5 |
| Expansion | Expanding agent |  | Butane | Butane | Butane | Butane | Butane | Butane |
|  | Addition amount of expanding agent | wt part | 11 | 11 | 11 | 11 | 11 | 11 |
|  | Expansion temperature | °C. | 143 | 143 | 143 | 143 | 144 | 144 |
|  | Particle weight | mg | 1.2 | 1.2 | 1.2 | 1.2 | 1.2 | 1.2 |
|  | Bulk density | g/L | 31 | 31 | 32 | 31 | 30 | 30 |
|  | MHME | J/g | 16.8 | 16.5 | 16.9 | 16.6 | 16.5 | 16.5 |
| Molding | Apparent density of molding | g/L | 46 | 47 | 45 | 44 | 47 | 46 |
|  | Lowest molding steam temperature | Mpa (gauge pressure) | 0.26 | 0.23 | 0.29 | 0.24 | 0.25 | 0.26 |

TABLE 2

|  |  |  | Comparative Example 1 | Comparative Example 2 | Comparative Example 3 | Comparative Example 4 |
|---|---|---|---|---|---|---|
| Polypropylene resin | Kind |  | Ethylene-propylene random copolymer | Ethylene-propylene random copolymer | Ethylene-propylene random copolymer | Ethylene-propylene random copolymer |
|  | wt part |  | 100 | 100 | 100 | 100 |
| Polyethylene resin | Melt viscosity | mPa·S | — | 265 | 60 | 11000 |
|  | Density | g/cm3 | — | 0.91 | 0.97 | 0.93 |
|  | wt part |  | — | 0.5 | 0.5 | 10 |
| Master batch | Carbon black | wt % | — | — | — | — |
|  | wt part |  | — | — | — | — |
| Expansion | Expanding agent |  | Butane | Butane | Butane | Butane |
|  | Addition amount of expanding agent | wt part | 11 | 11 | 11 | 11 |
|  | Expansion temperature | °C. | 144 | 144 | 144 | 143 |
|  | Particle weight | mg | 1.2 | 1.2 | 1.2 | 1.2 |
|  | Bulk density | g/L | 32 | 31 | 31 | 32 |
|  | MHME | J/g | 16.8 | 16.7 | 16.7 | 16.6 |
| Molding | Apparent density of molding | g/L | 45 | 45 | 45 | 46 |
|  | Lowest molding steam temperature | Mpa (gauge pressure) | 0.36 | 0.36 | 0.35 | 0.33 |

As shown in Tables 1 and 2, it was possible to reduce the heating steam pressure needed for molding of in-mold expansion-molded articles having a fusion rate of 75% or more, by adding a polyethylene resin having a melt viscosity of 10 to 2000 mPa·s in an amount of 1 to 20 wt parts to the polypropylene resin.

INDUSTRIAL APPLICABILITY

It is possible according to the present invention to reduce the heating steam pressure needed for molding and the energy needed for production of in-mold expansion-molded articles, when in-mold expansion-molded articles, such as those used as buffering packing materials, shipping boxes, automobile interior parts, core materials for automobile bumpers and heat insulators, are molded by a in-mold expansion molding method of using pre-expanded polypropylene resin particles obtained from polypropylene resin particles produced by underwater cutting method.

The invention claimed is:

1. Pre-expanded polypropylene resin particles, characterized by being prepared by melt-kneading a polypropylene resin composition in an extruder, extruding the composition through nozzles of a die connected to the tip of the extruder into water, cutting the extruded resin composition in the water with a revolving cutter blade into polypropylene resin particles, placing the polypropylene resin particles, water, a dispersant, and an expanding agent to a pressure container to give a mixture, heating the mixture to a temperature not lower than the softening point of the polypropylene resin particles, impregnating the polypropylene resin particles with the expanding agent under pressure, and discharging the mixture out of the pressure container into low-pressure atmosphere, wherein the polypropylene resin composition contains 1 to 20 wt parts of a polyethylene resin having a melt viscosity of 10 to 2000 mPa·s at 140° C. with respect to 100 wt parts of the polypropylene resin, said polyethylene resin being at least one selected from a group consisting of polyethylenes such as high-density polyethylenes (HDPE), medium-density polyethylenes (MDPE), low-density polyethylenes (LDPE) and linear low-density polyethylenes (L-LDPE); ethylene-butene copolymers, and ethylene-vinyl acetate copolymers.

2. The pre-expanded polypropylene resin particles according to claim 1, wherein the particle weight of the pre-expanded polypropylene resin particles is 0.4 to 2.0 mg/particle.

3. The pre-expanded polypropylene resin particles according to claim 1, wherein the heat of the fusion peak appearing in the highest-temperature region during thermal analysis of the pre-expanded polypropylene resin particles by differential scanning calorimetry is 5 to 50 J/g.

4. A method of producing the pre-expanded polypropylene resin particles according to any one of claims 1 to 3, comprising melt-kneading a polypropylene resin composition in an extruder, extruding the composition through nozzles of a die connected to the tip of the extruder into water, cutting the extruded resin composition in the water with a revolving cutter blade into polypropylene resin particles, placing the polypropylene resin particles, water, a dispersant, and an expanding agent to a pressure container to give a mixture, heating the mixture to a temperature not lower than the softening point of the polypropylene resin particles, impregnating the polypropylene resin particle with the expanding agent under pressure, and discharging the mixture out of the pressure container into low-pressure atmosphere, wherein the polypropylene resin composition contains 1 to 20 wt parts of a polyethylene resin having a melt viscosity of 10 to 2000 mPa·s at 140° C. with respect to 100 wt parts of the polypropylene resin.

5. The method of producing the pre-expanded polypropylene resin particles according to claim 4, wherein the polyethylene resin has a melt viscosity of 10 to 1500 mPa·s at 140° C.

6. An in-mold expansion-molded article, characterized by being prepared by in-mold expansion molding of the pre-expanded polypropylene resin particles according to any one of claims 1 to 3.

* * * * *